United States Patent [19]

Murthy et al.

[11] Patent Number: 4,737,384

[45] Date of Patent: Apr. 12, 1988

[54] DEPOSITION OF THIN FILMS USING SUPERCRITICAL FLUIDS

[75] Inventors: Andiappan K. S. Murthy, Convent Station; Alex Y. Bekker, Teaneck; Kundanbhai M. Patel, Landing, all of N.J.

[73] Assignee: Allied Corporation, Morris Township, Morris County, N.J.

[21] Appl. No.: 793,935

[22] Filed: Nov. 1, 1985

[51] Int. Cl.[4] .......................... B01D 15/08; B05D 3/12; C02F 1/28

[52] U.S. Cl. .................................... 427/369; 210/658; 427/370

[58] Field of Search .......................... 210/658; 264/12; 427/421, 430.1, 369, 370

[56] References Cited

U.S. PATENT DOCUMENTS 4,582,731 4/1986 Smith .................................. 427/421

FOREIGN PATENT DOCUMENTS 2853066 6/1980 Fed. Rep. of Germany .

OTHER PUBLICATIONS

"Supercritical Fluids Offer Improved Separations" Chem. Eng. News, vol. 59(31) pp. 16–17 (1981).

"Extraction with Supercritical Gases" Chem. Eng. Science, vol. 36, 11 pp. 1769–1788 (1981) D. F. Willians et al.

*Primary Examiner*—Michael R. Lusignan

*Attorney, Agent, or Firm*—Richard C. Stewart; Gerhard H. Fuchs

[57] ABSTRACT

A process of depositing thin film onto a substrate using super-critical fluids.

17 Claims, 2 Drawing Sheets

DEPOSITION OF THIN FILMS USING SUPERCRITICAL FLUIDS

BACKGROUND

1. Field of the Invention

This invention relates to a process for the deposition of thin films. More particularly, this invention relates to a process for deposition of such films using supercritical fluids.

2. Prior Art

There are several developed techniques which are used for thin film deposition. The most important are chemical vapor deposition and the vacuum deposition. However, several problems are associated with these methods which compelled researchers to investigate new routes for thin film preparation.

One of the most serious problems associated with chemical vapor deposition and vacuum deposition is that these methods result in the deposition of atoms or very simple molecules only. Moreover, chemical vapor deposition requires exotic starting materials and both chemical vapor deposition and vacuum deposition require high temperatures which are disadvantageous. An additional disadvantage of vacuum deposition is the requirement of sophisticated equipment for a high vacuum operation, and a disadvantage of both of these prior art methods is the necessity to use supports of specific geometrical shapes. Another disadvantage of chemical vapor deposition is contamination of films by heterogeneous elements present in a vapor phase.

Historically, interest in supercritical fluids was related to the observation that such fluids were often excellent solvents in the same manner as normal liquids. As a result most of the proposed industrial applications were associated with the extraction of the specific products from liquid and solid mixtures. At present more than 100 processess which employ this idea are patented. Decaffeination of coffee, extraction of light oils from residual oils and coal, certain classess of chemicals from natural products, organics from water and oligomers from polymers are the most often mentioned examples of supercritical fluid applications.

In addition to the above, the unusual properties of super critical fluids stimulate attention of investigators in the "non-traditional" areas. A process concept to utilize the pressure-dependent solvation power of supercritical fluids to comminute materials was reported in 1981 Chem. Eng. News, vol. 59, (31), pp 16–17 (1981). In the industry, comminution of materials is carried out by grinding or by precipitation from solution. However, many chemicals are sensitive to these processes because of temperature effects or because of co-precipitation of impurities from liquid stream. Supercritical fluids nucleation offers the potential to tailor particle size and size distribution without temperature and solvent impurity limitations. Attractive candidates for comminution by super critical fluid nucleation are heat labile dyes, fine chemicals, pharmaceuticals and intermediates which must be formed in some specific particle size for subsequent processing or use.

German patent No. 2,853,066.7 describes a process for covering the surface of porous powders or porous bodies and fabrics with protective or decorative layers by contacting the material with a gas in the supercritical state as a liquid medium. The gas contains the solid or liquid covering material in solution.

Quite a different application for supercritical fluids is in the hydrothermal breeding of synthetic quartz crytals in supercritical water at about 670° K. and 100–200 MPa (Williams D. F., Chem. Eng. Science Vol 36, 11, p. 1769 (1981)). In a wider context it has been forecast that supercritical extraction will find application in the upgrading refractories, particularly when used in combination with liquid solvents.

SUMMARY OF THE INVENTION

The present invention is directed to a process for depositing a thin metal or polymer coating onto a substrate. More particularly, the process of this invention comprises the steps of:

exposing a substrate at supercritical temperatures and pressures to a solution comprising a metal or polymer dissolved in water or a non-polar organic solvent, said metal or polymer being substantially insoluble in said solvent under sub-critical conditions and being substantially soluble in said solvent under super critical conditions; and, reducing the pressure, or temperature and pressure to sub-critical values, thereby depositing a thin coating of said metal or polymer on said substrate.

Several advantages result from the process of this invention as compared to conventional chemical vapor deposition and vacuum deposition techniques. For example, the process of this invention can be used with thermally unstable compounds, because the solution concentration of the metal or polymer to be deposited as a coating is more a function of pressure rather than temperature. Moreover, substrates of any geometrical shape can be conveniently used, and high purity films can be applied to the substrate. Furthermore, properties of the film can be conveniently modified by manipulation of temperature, and no special arrangements for heating or coating the substrate are required. Likewise, deposition of the coating can be accomplished at any desired temperature, which is important when a control over the crystallinity of the coating is required. Other advantages which flow from the process of this invention will be apparent from the following disclosure.

BRIEF DESCRIPTION OF THE DRAWINGS

The present invention will be more fully understood from the following description taken in conjunction with the accompanying drawings wherein.

DESCRIPTION OF THE PREFERRED EMBODIMENTS OF THE INVENTION

Figure 1:
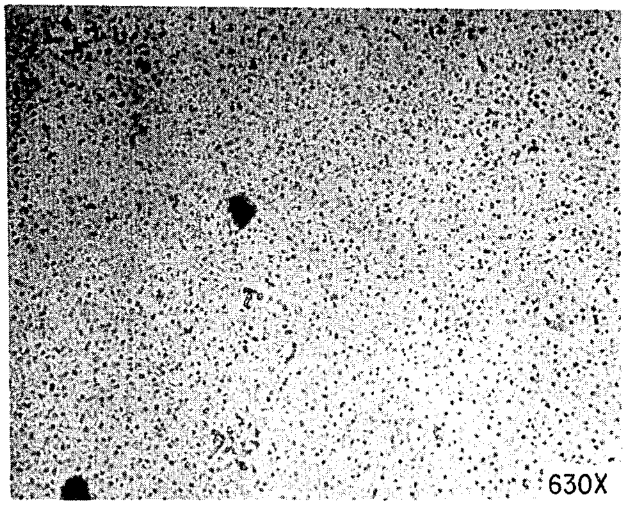
FIG. 1 is a photomicrograph, magnified 630×, showing a top planar view of a selenium film on a glass support deposited from a solution of selenium in benzene at a temperature of 350° C. and a pressure of 80.3 atms.

The process of this invention consist of two essential steps. In the first step of the process of this invention, a substrate is exposed to a solution of a metal or polymer in a solvent selected from the group consisting of non-polar inert organic solvents and water under super critical conditions. Metals and polymers which can be used in the process of this invention can vary widely. Illustrative of useful metals are selenium, arsenic, gallium, germanium, erbium, boron, aluminum, bismith, calcium, zinc, tellerium, cadmium, tin, barium, copper, gold, lithium, rubidium, europium, rhenium, terbium, indium, silicon, dysprosium, cerium, ytterbium, arsenic, gadolinium, polonium, lutetium, holmium and the like. Also useful in the practice of this invention are metal compounds and alloys such as cuprous oxide, gallium arsenide, selenium oxide, erbium selenide, lead sulfide, indium arsenide, silicon carbide, germanium silicon alloys and the like. Useful polymers include polyolefins such as polyethylene, polypropylene, poly-(1-butene), and the like; polystyrenes such as polystrene, poly(2-methylstyrens) and the like; polyhalolefins such as poly(vinyl fluoride), poly(vinyl chloride) and the like; polyvinyls such as poly (vinyl alcohol), poly(vinylacetate), poly (vinyl ethyl ether) and the like; polyacrylatec such as poly(acrylic acid), poly(methyl acrylate), and the like; polyacrylics such as polyacrylonitrile, polyacrylamide, and the like; polyoxides, such as poly(ethylene oxide), poly(propylene oxide) and the like; polysulfides such as poly(phenylene sulfides), and the like; polyesters such as poly(butylene terephthalate), poly(ethyle terephthalate) and the like; polyamides such as poly(4-amino butyric acid), poly(caprolactam), poly(-hexamethylene adipamide) and the like; and poly carbonates such as poly[methane bis(4-phenyl) carbonate], poly [1,1-ethane-bis-(4-phenyl)carbonate]; and the like; and conductive polymers such as polyaniline, polyphenylene, polyphenylene oxide, polythiophene polyacetylene, polypyrrole and the like. Preferred for use in the proactice of this invention are metallic and non-metallic alloys, and elements and metallic compounds. Particularly perferred for use are such materials which are useful in the construction of electronic and photoelectronic parts such as semiconductors, photoelectric cell components, electronic-tube components and like, as for example rhenium, selenium, boron, cuprous oxide, erbium selenide, germanium/silicon alloys, gallium arsenide, indium, indium arsenide, terbium, lead sulfide and the like.

Useful solvents can also vary widely and include inert organic solvents and water. As used herein, an "inert organic solvent" is any organic solvent which is essentially non-reactive with the material being deposit and the substrate under the process conditions. Illustrative of useful solvents which can be used in the practice of this invention are water, aromatic solvents such as benzene, xylene, toluene, anisole and the like, hydrocarbon solvents such cyclohexane, n-hexane, n-pentane, n-heptane and the like; ethers such as tetrahydrofuran and the like; and halocarbons such as chlorobenzene, carbon tetrachloride and the like. Preferred solvents are aromatic solvents such as benzene.

The particlar solvent used in any situation will depend primarily on the material being deposited as a coating. In general, the material is substantially soluble in the solvent at and/or above the critical temperature and pressure of the solvent and substantially insoluble in the solvent at some subcritical temperature and pressure. In the preferred embodiments of the invention, solvents are selected such that the solvent has a relatively low critical pressure i.e., from about 10 to about 200 atms, more preferably from about 20 to about 150 atms; a critical temperature in a region of appreciable vapor pressure for the material being deposited, i.e. a vapor pressure of at least about 1 mm Hg, preferably at least about 5 mm Hg and more preferably at least 10 mm Hg. In the preferred embodiments of the invention it is preferred that there be some chemical affinity between the solvent and the material being deposited which positively affects the solubility of the material in the solvent under super-critical conditions. For example, useful combinations of solvents and materials having such affinities include benzene and selenium, styrene and polystyrene, propylene and polyethylene, propylene and polyethylene, tetrafluoroethylene and various perfluorinated polymers, carbon dioxide and various epoxies, ammonia and nylons, ethylene and polyethylene and the like. In addition the material to be deposited must be soluble in the solvent to some extent under super-critical conditions and relatively insoluble at some sub-critical temperature and/or pressure. The solubility is indeed critical because it impacts on the concentration of the material being deposited and as a results, the thickness of the deposited coating. In general, the solubility of the material in the solvent in the super critical state is at least about 0.1 mole %, based on the total moles of material and solvent and the solubility at a subcritical state is not greater than about 0.01 mole % based on the total moles of material and solvent. In the preferred embodiments of the invention, the solubility of the material under super-critical condition is at least about 0.1 mole % based on the total moles of material and solvent, and the solubility at some subcritical state is not greater than about 0.01 mole % based on the total moles of material and solvent. In the particularly preferred embodiments of the invention, the solubility of the material at some super critical state is about 10 mole % based on the total moles of material and solvent, and the solubility at some sub critical state is not greater than about 0.001 mole % on the afore-mentioned basis.

The substrate can vary widely depending in the use of the coated substrate. The substrate can be an electrically conductive material such as a metal, alloy or metallic compound, a dielectric material such as a ceramic, or a semi-conductive material. In the preferred embodiments of the invention the substrate is cleaned to removed grease and dirt from the surface being coated through use of some conventional technique as for example washing with water followed by hexane or acetone and a conventional dewatering treatment.

The super critical condition employed can vary widely, the only requirement being that the temperature and pressure employed are equal to or greater than the critical temperature and pressure of the particular solvent chosen for use. Experimentation has shown that for the case of selenium metal and benzene the temperature employed within the above-referenced range does not affect the deposition. However, for benzene and selenium metal experimentation has also shown that the amount of selenium dissolved in the benzene increases with increasing pressure, which results in an increase in the amount of selenium deposited on the substrate. It is believed that other solvent/material solutions will interact in substantially the same way. Accordingly, higher critical pressures are preferred. In the particularly preferred embodiments, the pressure employed is about 30 atm greater than the critical pressure, and in the most preferred embodiments is 50 atm greater than the critical pressure.

In general, the substrate is contact with the solution using conventional procedures. For example, in the preferred embodiments, the material, preferably in particulate form is placed in an enclosure such as an autoclave, or other pressurizable enclosure with the substrate and the solvent. The enclosure is such that supercritical conditions can be maintained, and the super critical solvent fluid is formed which solvates the material. The conditions are maintained for period of time sufficient to allow for equilibration, which general occurs in from a few minutes to a day or more, preferaly is in from about five minute to two or three hours. After equilibration, the system is then restored to sub-critical conditions, which because of the relative insolubility of the material in the solvent under sub-critical conditions results in precipitation of the dissolved material from solution into the surface of the substrate.

The thickness of the deposit can vary widely, usually depending on the amount of material dissolved in the solution under super critical condition. In general, the thickness of the deposited coating is at least about 50 Å thick. In the preferred embodiments of the invention, the relative solubilities are such that the thickness of the deposited coatng is from about 50 Å to about 1,000 Å, and in the particularly preferred embodments in from about 100 Å to about 10,000 Å. Amongst these particularly preferred embodiments, most preferred are those embodiments in which the relative solubilities are such that the thickness of the deposited coating is from about 500 Å to about 100,000 Å. The desired thickness can be attained employing a single cycle of the process of this invention, as can be attained employing two or more cycles.

The process of this invention is useful in those instances where it is desired to deposit a thin layer coating on to a substrate. The invention is especially useful in microelectronic applications, such as in electronic tubes and photoelectric tubes as semiconductors, insulators, photosensitive coatings and the like.

The following specific examples are presented to more particularly illustrate the invention and are not to be construed as limitations thereon.

EXAMPLES 1 TO 7

General Procedure:

Experimental apparatus consisted of a standard 300 cc high pressure autoclave equipped with a pressure transducer, temperature controlled electrical heater, and inlet and outlet high pressure valves. Four glass substrate plates were placed at different heights in the autoclave using a specially designed holder.

In a typical experiment, a known amount of metallic selenium and an amount of benzene (precalculated to achieve the desired pressure) were preheated to the desired temperature, and maintained at the desired temperature and pressure for a designated period of time. Thereafter, the apparatus is cooled to room temperature and purged with nitrogen, the autoclave opened and samples collected for analysis. Conditions of the experiments are given in the following TABLE I.

TABLE I

| Ex. No. | Temp (°C.) | Pressure, (psig) | Benzene (g) | Preheating Time (min) | Heating Time (min) |
|---|---|---|---|---|---|
| 1. | 405 | 2050 | 10.6 | 135 | 42 |
| 2. | 405 | 390 | 10.8 | 71 | 54 |
| 3. | 343 | 1170 | 110.0 | 160 | 38 |
| 4. | 351 | 140 | 6.0 | 62 | 40 |
| 5. | 349 | 1160 | 112.0 | 170 | 77 |
| 6. | 350 | 1140 | 112.0 | 158 | 37 |

TABLE I-continued

| Ex. No. | Temp (°C.) | Pressure, (psig) | Benzene (g) | Preheating Time (min) | Heating Time (min) |
|---|---|---|---|---|---|
| 7. | 352 | 140 | 7.0 | 78 | 111 |

Figure 2:
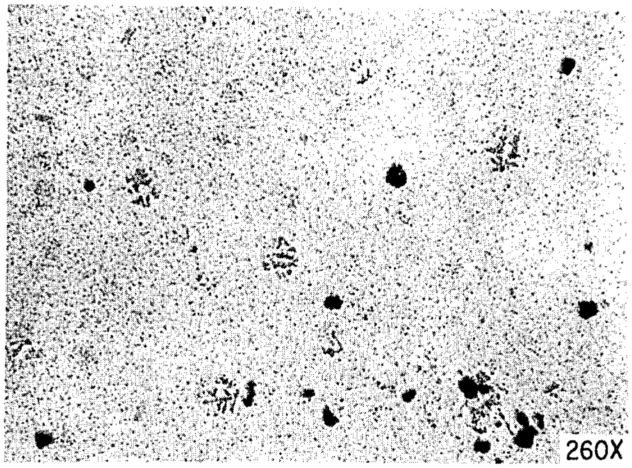
FIG. 2 is a photo micrograph of the film of FIG. 1 magnified 260×.
Figure 3:
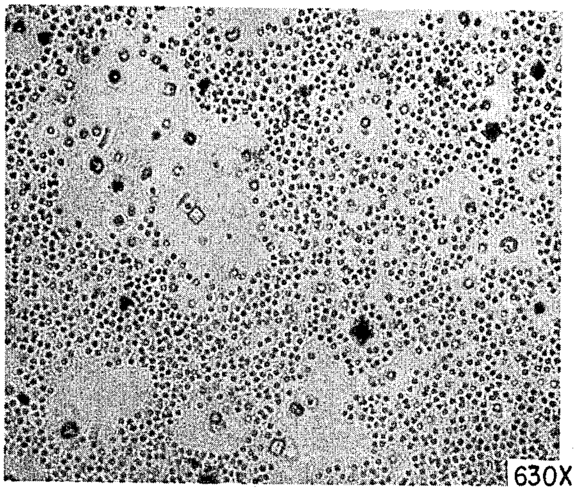
FIG. 3 is a photomicrograph, magnified 630×, showing a top planar view of a selenium film on a glass support deposited from a solution of selenium in benzene it a temerature of 350° C. and a pressure of 10 atms.
Figure 4:
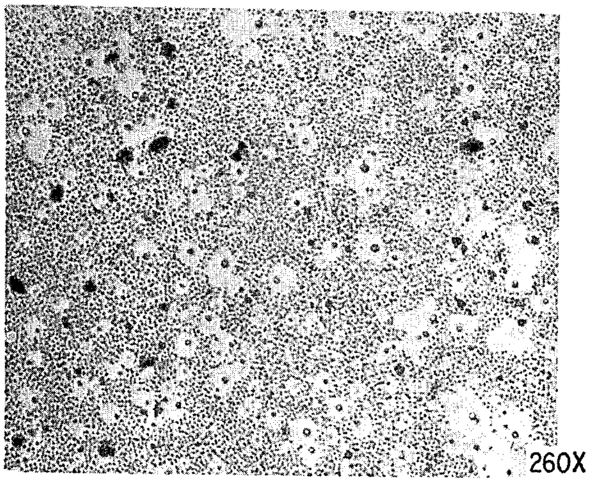
FIG. 4 is a photomicrograph of the film of FIG. 3 magnified 200×.

Using optical techniques, samples from Examples 3 and 4 were examined (results of wich are reported in FIGS. 1 to 4). A sample from the high pressure experiment of Example 3 consisted of closely packed selenium "crystallities" with a few large, dart paticles. FIGS. 2 and 3 show sample from the low pressure experiment of Example 4 appeared to have areas with no visible material and a number of larger particles in addition to the samll crystallities.

Thickness of the films were measured using s stylus displacement technique. It was found that the thickness of the film from experiment of Example 3 is approximatley 1500 Å. Similar measurements for the low pressure experiment of Example 4 could not be performed because of nonuniformity of the deposited material.

Chemical composition of the deposited composition of the high pressure experiment of example 3 and the low pressure experiment of Example 4 were determined by ESCA.

The observed ESCA intensity ratios for the samples are given in TABLE 2. These values represent peak intensities and do not reflect atomic composition. They can be used, however, to compare relative concentrations in the samples.

TABLE 2

| | EXPERIMENTAL ESCA INTENSITY RATIOS | | | | | |
|---|---|---|---|---|---|---|
| Sample | O1s/ Si2P | C1s/ Si2p | Na1s/ Si2p | C12p/ Si2p | Sn3d/Si2p | Se3d/Si2p |
| Ex 3 | 18.0 | 31.0 | 5.3 | 2.2 | 3.3 | 1.6 |
| Ex 4 | 6.3 | 1.1 | 1.4 | 0.52 | — | — |

— Not Found

As indicated in TABLE 2, only the high pressure experiment of Example 3 deposited a measureable amount of selenium on the surface of the glass plate. The intensities of the selenium peaks in the high pressure experiment of Example 3 was six times that of those resulting from the low pressure Experiment of Example 4.

What is claimed is:

1. A process for depositing a thin coating of a metallic or non-metallic material onto a substrate which comprises the steps of:

exposing a substrate, at a super critical temperature and pressure, to a solution of the material dissolved in water or an organic solvent, said material being substantially insoluble in said solvent under sub critical temperatures, pressures or temperatures and pressures and substantially soluble in said solvent under super critical temperatures and pressures; and reducing the pressure, or temperature and pressure, to sub critical values depositing a substantially uniform thin coating of said material on said substrate.

2. A process according to claim 1 wherein said material is a metal.

3. A process according to claim 2 wherein said metal is selenium.

4. A process according to claim 1 wherein said material is a non-metallic material.

5. A process according to claim 4 wherein said nonmetallic material is a polymeric material.

6. A process according to claim 1 wherein said material is dissolved in water.

7. A process according to claim 1 wherein said material is dissolved in an organic solvent.

8. A process according to claim 7 wherein the critical pressure of said solvent is from about 10 to about 200 atmospheres.

9. A process according to claim 7 wherein said pressure is from about 20 to about 150 atmospheres.

10. A process according to claim 9 wherein said solvent is an aromatic solvent.

11. A process according to claim 10 wherein said solvent is benzene.

12. A process according to claim 1 wherein the solubility of said material in the solvent in the super-critical state is at least about 0.1 mole % based on the total moles of solvent and material and the solubility in a sub-critical state is not greater than about 0.01 mole % on the afore-mentioned basis.

13. A process according to claim 12 wherein said solubility in the super-critical state is at least about 1 mole % and the solubility in some sub-critical state is not greater than about 0.01 mole %.

14. A process according to claim 13 wherein said solubility in the super-critical state is about 10 mole % and the solubility in some sub-critical state is not greater than about 0.001 mole %.

15. A process according to claim 1 wherein the vapor pressure of said material is at least about 1 mm Hg at the critical temperature of said solvent.

16. A process according to claim 15 wherein said vapor pressure is at least about 5 mm Hg.

17. A process according to claim 16 wherein said vapor pressure is at least about 10 mm Hg.

* * * * *